(12) United States Patent
Muramatsu et al.

(10) Patent No.: US 7,734,956 B2
(45) Date of Patent: Jun. 8, 2010

(54) PROCESS MANAGEMENT SYSTEM

(75) Inventors: Gentaro Muramatsu, Kanagawa (JP);
Masao Fujikawa, Kanagawa (JP);
Shingo Mizuno, Kanagawa (JP);
Takako Sakuma, Kanagawa (JP)

(73) Assignee: Evolium S.A.S., Paris (FR)

( * ) Notice: Subject to any disclaimer, the term of this patent is extended or adjusted under 35 U.S.C. 154(b) by 597 days.

(21) Appl. No.: 11/184,815

(22) Filed: Jul. 20, 2005

(65) Prior Publication Data
US 2006/0048000 A1  Mar. 2, 2006

(30) Foreign Application Priority Data
Aug. 25, 2004  (JP) ............................. 2004-244690

(51) Int. Cl.
*G06F 11/00* (2006.01)
(52) U.S. Cl. ......................................... 714/25; 711/221
(58) Field of Classification Search .................. 714/23
See application file for complete search history.

(56) References Cited

U.S. PATENT DOCUMENTS

| | | | | |
|---|---|---|---|---|
| 3,838,260 A | * | 9/1974 | Nelson ......................... | 714/25 |
| 4,325,120 A | * | 4/1982 | Colley et al. ................. | 711/202 |
| 5,134,693 A | * | 7/1992 | Saini ........................... | 712/244 |
| 5,339,450 A | * | 8/1994 | Nagahara ..................... | 717/170 |
| 5,644,699 A | * | 7/1997 | Yoshida ......................... | 714/7 |
| 6,453,430 B1 | * | 9/2002 | Singh et al. .................... | 714/47 |
| 6,625,756 B1 | * | 9/2003 | Grochowski et al. .......... | 714/17 |
| 7,085,225 B2 | * | 8/2006 | Schaller et al. ............. | 370/217 |
| 2007/0168724 A1 | * | 7/2007 | Kohiga ......................... | 714/23 |

OTHER PUBLICATIONS

Patent Abstracts of Japan, Publication No. 2000-122971, dated Apr. 28, 2000.
Patent Abstracts of Japan, Publication No. 11-265361, dated Sep. 28, 1999.

* cited by examiner

*Primary Examiner*—Scott T Baderman
*Assistant Examiner*—Kamini Patel
(74) *Attorney, Agent, or Firm*—Sughrue Mion, PLLC

(57) ABSTRACT

There is provided a process management system which, when a crash occurs in execution of a processing process, can immediately restart a processing process while holding data used in occurrence of the crash as much as possible. When a determination unit determines that a detected crash is not a crash caused by data used in a processing process, a processing unit reexecutes the processing process in which the crash occurs. When the determination unit determines that the detected crash is a crash caused by the data used in the processing process, an initialization unit initializes the data used in the processing process.

5 Claims, 8 Drawing Sheets

| TYPE OF FLAG | DATA | | | | | |
|---|---|---|---|---|---|---|
| | 1 | 2 | 3 | 4 | ... | n |
| PROCESS IDENTIFICATION FLAG | UNNECESSARY | UNNECESSARY | NECESSARY | UNNECESSARY | ... | UNNECESSARY |
| INITIALIZATION FLAG | CONTINUE | CONTINUE | CONTINUE | CONTINUE | ... | CONTINUE |

[FIG.5]

| TYPE OF FLAG | DATA | | | | | |
|---|---|---|---|---|---|---|
| | 1 | 2 | 3 | 4 | ... | n |
| PROCESS IDENTIFICATION FLAG | UNNECESSARY | UNNECESSARY | UNNECESSARY | UNNECESSARY | ... | UNNECESSARY |
| INITIALIZATION FLAG | CONTINUE | CONTINUE | CONTINUE | CONTINUE | ... | CONTINUE |

[FIG.6]

| TYPE OF FLAG | DATA | | | | | |
|---|---|---|---|---|---|---|
| | 1 | 2 | 3 | 4 | ... | n |
| PROCESS IDENTIFICATION FLAG | UNNECESSARY | UNNECESSARY | UNNECESSARY | UNNECESSARY | ... | UNNECESSARY |
| INITIALIZATION FLAG | CONTINUE | CONTINUE | INITIALIZATION | CONTINUE | ... | CONTINUE |

[FIG.7]

| TYPE OF FLAG | DATA | | | | | |
|---|---|---|---|---|---|---|
| | 1 | 2 | 3 | 4 | ... | n |
| PROCESS IDENTIFICATION FLAG | UNNECESSARY | UNNECESSARY | NECESSARY | UNNECESSARY | ... | UNNECESSARY |
| INITIALIZATION FLAG | CONTINUE | CONTINUE | INITIALIZATION | CONTINUE | ... | CONTINUE |

| NUMBER | EXECUTION SITUATION | STATE OF DATA | PROCESS IDENTIFICATION FLAG | INITIALIZATION FLAG |
|---|---|---|---|---|
| 600 | IN EXECUTION | UNINITIALIZATION | IDENTIFIER CORRESPONDING TO INITIALIZATION PROCESS | INITIALIZATION |
| 610 | WAITING FOR EXECUTION | NORMAL | | CONTINUE |
| 620 | IN EXECUTION | NORMAL | IDENTIFIER CORRESPONDING TO EXECUTED PROCESS | CONTINUE |
| 630 | CRASH | NORMAL | IDENTIFIER CORRESPONDING TO FINALLY EXECUTED PROCESS | CONTINUE |
| 640 | WAITING FOR EXECUTION | MIGHT BE ABNORMAL | | INITIALIZATION |
| 650 | IN EXECUTION | MIGHT BE ABNORMAL | IDENTIFIER CORRESPONDING TO EXECUTED PROCESS | INITIALIZATION |
| 660 | CRASH | MIGHT BE ABNORMAL | IDENTIFIER CORRESPONDING TO FINALLY EXECUTED PROCESS | INITIALIZATION |

[FIG.13]

PROCESS MANAGEMENT SYSTEM

TECHNICAL FIELD

This application claims priority under 35 U.S.C. §119(a) to Japanese Patent Application No. JP 2004-244690, filed on Aug. 25, 2004, the entire contents of which are hereby incorporated by reference.

The present invention relates to a process management system for executing a processing process and recovering the processing process when a crash occurs in execution of the processing process, and more particularly, relates to a process management system for determining whether a processing process crashes due to data abnormality and recovering the processing process on the basis of a determination result.

In this specification, a "crash" means that execution of a processing process is interrupted at a part, which is not expected by a software manufacturer of the processing process, and mainly means a state in which execution of a processing process is forcibly interrupted by an operating system in the course of processing.

BACKGROUND ART

When software is not created to correctly operate, a processing process may crash at a faulty part. In complicated and large-scale software, it is difficult to completely eliminate such faulty parts. The faulty parts which cause a crash in the processing process are frequently included in specific data. When such data has a problem, or when the specific data cannot be correctly processed due to faulty software for the processing process, the processing process cannot be continued unless the data is eliminated. In addition, an access timing or the like may cause a crash in the processing process. In this case, the processing process is reexecuted to make it possible to solve the problem.

When execution of the processing process is stopped, loss of data and stop of service must be minimized. For this purpose, the problem may be solved by providing multi-equipment system. However, in such a case, additional capital investment is required. This is not a preferable method of solving the problem.

Therefore, a large number of techniques for solving problems caused by a crash in a processing process are disclosed.

For example, before a fault such as a crash occurs, rebooting of a system in which a fault probably occurs is disclosed in Japanese Patent Application Laying Open (KOKAI) No. 2000-122971. Japanese Patent Application Laying Open (KOKAI) No. 11-265361 discloses a multi computer system including a communication processing device which does not open a terminal path to avoid an electronic document discarding, the transaction of which is not executed, in a shared file in rebooting of a computer, even though a fault occurs in a transaction processing system, and a transaction processing system which does not initialize the shared file in rebooting.

[Patent Reference 1] Japanese Patent Application Laying Open (KOKAI) No. 2000-122971

[Patent Reference 2] Japanese Patent Application Laying Open (KOKAI) No. 11-265361

DISCLOSURE OF THE INVENTION

Problems To Be Solved By The Invention

The present invention provides a process management system, which can immediately restart a processing process while holding data as much as possible when a crash occurs in execution of the processing process.

Means To Solving The Problems

According the invention described in claim 1, there is provided a process management system, which executes a processing process and recovers the processing process when a crash occurs in execution of the processing process, comprising:

a data memory area for holding data necessary for execution of the processing process;

a processing unit for executing the processing process by using the data held in the data memory area;

a crash detection unit for detecting that the processing process is interrupted due to a crash in execution of the processing process by the processing unit;

a determination unit for determining whether the detected crash is a crash caused by the data used in the processing process, on the basis of a crash history related to the processing process in which the crash occurs; and an initialization unit for initializing the data held in the data memory area, and characterized in that:

when the determination unit determines that the detected crash is not a crash caused by the data used in the processing process, the processing unit reexecutes the processing process in which the crash occurs, and when the determination unit determines that the detected crash is a crash caused by the data used in the processing process, the initialization unit initializes the data used in the processing process.

With this configuration, when a crash occurs in the processing process, the processing process is reexecuted without testing the details of the data used in the processing process in which the crash occurs, or the processing process can be restarted by initializing the data while holding the data used in occurrence of the crash as much as possible.

According to the invention described in claim 2, the determination unit determines that the crash is not caused by the data used in the processing process when a crash did not occur in the past in the processing process in which the detected crash occurs, and determines that the crash is caused by the data used in the processing process when a crash occurred in the past in the processing process in which the detected crash occurs.

With this configuration, when a crash occurs in the processing process in which a crash did not occur in the past, it may be considered that the crash is caused by, e.g. an access timing. For this reason, the processing process is reexecuted to recover the processing process. On the other hand, when a crash occurs in a processing process which continuously uses the same data twice, the crash in the processing process is probably caused by the data. It is determined that the crash cannot be avoided even if the processing process is reexecuted, and the data used in the processing process is initialized to recover the processing process. With such a recovering method, the processing process can be immediately restarted.

According to the invention described in claim 3, the data memory area further includes a process identification flag representing whether each data is required to execute the processing process, and an initialization flag representing that crash occurred in the past and data must be initialized when a crash is detected.

With this configuration, the determination unit determines specific data used in the processing process by the process identification flag of the data to make it possible to easily determine whether the crash is caused by the data on the basis of the initialization flag of the data.

According to the invention described in claim 4, the processing unit includes a processing execution unit for executing a processing process and a waiting unit which waits to execute the processing process when a crash occurs.

With this configuration, after a crash occurs, the processing process can be immediately reexecuted by the waiting unit.

Best Modes For Carrying Out The Invention

Figure 1:
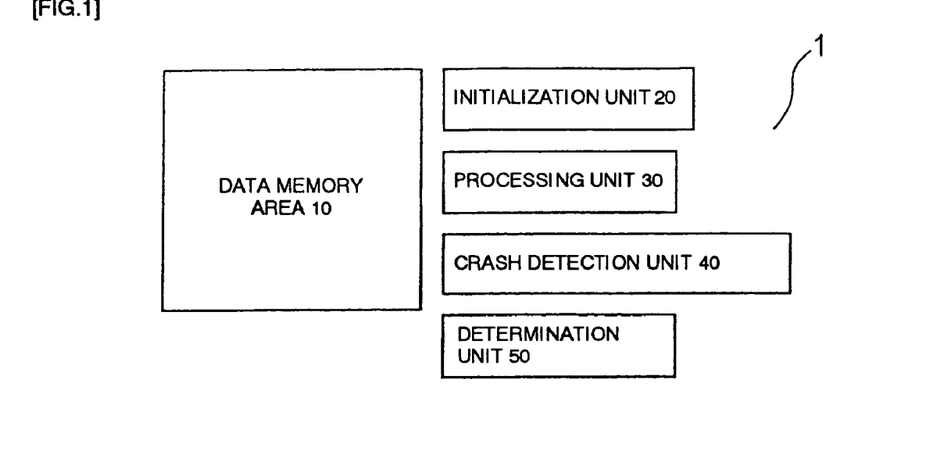
FIG. 1 is a schematic diagram showing a process management system.

FIG. 1 shows a schematic configuration of a process management system 1 according to the present invention. The process management system 1 includes a data memory area 10 which holds data necessary for execution of a processing process, a processing unit 30 which executes the processing process by using data held in the data memory region, a crash detection unit 40 which detects that the processing process is interrupted due to a crash in execution of the processing process by the processing unit 30, a determination unit 50 which determines whether the detected crash is a crash caused by the data used in the processing process, on the basis of a crash history related to the processing process in which the crash occurs, and an initialization unit 20 which initializes the data held in the data memory area 10.

Figure 2:
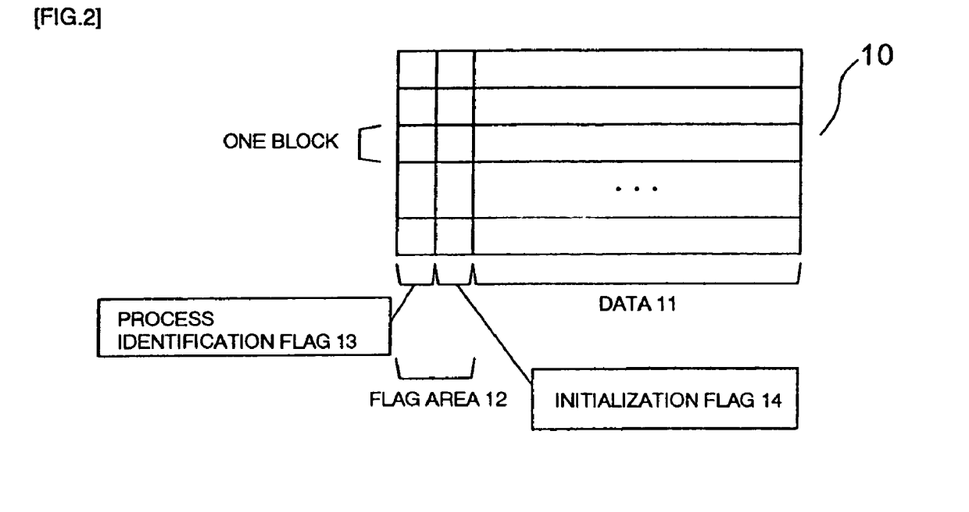
FIG. 2 shows an internal structure in a data memory area.

FIG. 2 shows the details of the internal structure of the data memory area 10.

The data memory area 10 consists of a plurality of blocks. Each block includes data 11 and a flag area 12 associated with the data 11. Each data 11 includes data the contents of which are not discarded at the end of the processing process and logically divided. As the data memory area 10, a shared memory, a disk, an external database system, or the like prepared in an operating system can be used. However, when the shared memory is used, the contents of the data are lost at the end of all the processing process.

A process identification flag 13 and an initialization flag 14 are stored in the flag area 12. The process identification flag 13 is a flag which identifies whether the data is necessary for execution of a processing process. For example, when the data is necessary for execution of the processing process, a "necessary" flag is set. When the data is not necessary for execution of the processing process, an "unnecessary" flag is set. The initialization flag 14 represents whether a crash occurred in the past. When a crash is detected again, the initialization flag 14 identifies whether the data must be initialized. For example, when a crash occurred in the past, an "initialization" flag is set as the initialization flag 14. When a crash did not occur in the past, a "continue" flag is set as the initialization flag 14. The above description is made on the assumption that the process identification flag 13 is a binary flag, which represents the data is necessary or unnecessary for execution of the processing process. However, when a plurality of processes are simultaneously executed in parallel to each other, the process identification flag 13 can be made a multivalued flag corresponding to the processing processes to make it possible to represent whether data is necessary or unnecessary for execution of the processing processes. When the process identification flag 13 has the above configuration, data used in a process which crashes in the plurality of processes can be identified.

Figure 3:
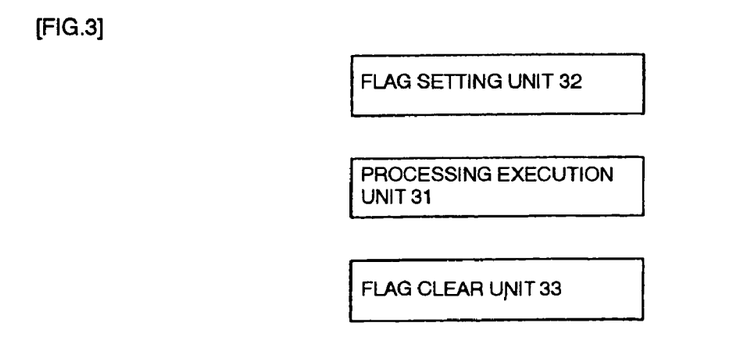
FIG. 3 shows an internal structure of a processing unit.

FIG. 3 shows the internal structure of the processing unit 30.

The processing unit 30 includes a processing execution unit 31, a flag setting unit 32, and a flag clear unit 33. The processing execution unit 31 is to execute a processing process by using the data 11 held in the data memory area 10.

Actual processing processes to be executed are written in the processing execution unit 31. The flag setting unit 32 sets a "necessary" flag as the process identification flag 13 of the data 11 necessary for the processing process before the processing execution unit 31 executes the processing process. The flag clear unit 33 deletes the "necessary" flag set as the process identification flag 13 to change the process identification flag 13 into an "unnecessary" flag after the completion of the processing process of the processing execution unit 31.

The processing unit 30 can be constituted to include a plurality of processing execution units 31. In this case, a certain processing execution unit can function as a waiting unit which do not execute a processing process when no crash occurs. The waiting unit reexecutes the processing process in place of the processing execution unit when crash occurs. In this manner, the waiting unit which has operated can immediately reexecute the processing process in occurrence of a crash.

Figure 4:
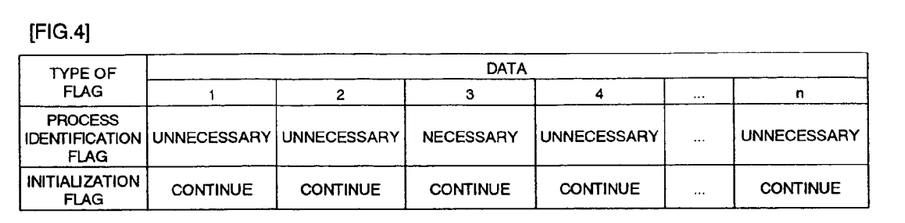
FIG. 4 shows states of a process identification flag and an initialization flag in execution of a processing process.
Figure 5:
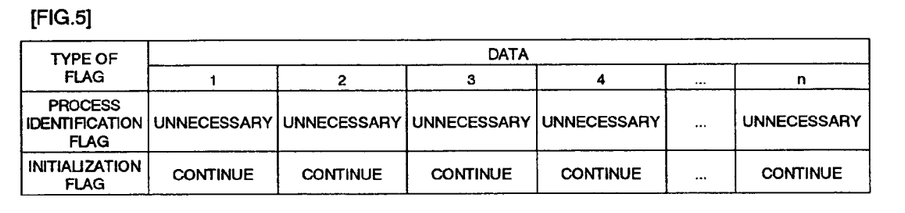
FIG. 5 shows states of the process identification flag and the initialization flag in execution of the processing process.

Operations of the process management system 1 according to the present invention will be described below with reference to FIGS. 4 and 5 showing the states of the process identification flag 13 and the initialization flag 14 in the data memory area 10.

It is assumed that n data 1 to n are present in the data memory area 10. In FIGS. 4 and 5, the "necessary" is expressed as the "necessary" flag set as the process identification flag 13, and the "unnecessary" is set as the "unnecessary" flag. "Initialization" is expressed as the "initialization" flag set as an initialization flag 14, and "continue" is expressed as the "continue" flag.

Before the processing process is activated, the initialization unit 20 initializes the data 11, an "unnecessary" flag is set as the process identification flag 13, and a "continue" flag is set as the initialization flag 14.

Before the processing execution unit 31 executes the processing process, the flag setting unit 32 sets the "necessary" flag as the process identification flag 13 of the data 11 necessary for the processing process to be executed. In the example in FIG. 4, the processing process uses data 3.

When the processing execution unit 31 completes the execution of the processing process by using the data 3, the flag clear unit 33 changes the process identification flag 13 of the data 3 into the "unnecessary" flag. This is shown in FIG. 5.

In this manner, before execution of the processing process, the "necessary" flag is set as the process identification flag 13 of the data used in each processing process. Upon completion of the processing process, the flag is changed into the "unnecessary" flag. These processes are sequentially repeated. In case of a processing process using a plurality of data, "necessary" flags are set as all the process identification flags 13 for the plurality of data to be used. Upon completion of the processing process, the plurality of flags are changed into "unnecessary" flags. In this manner, specific data used in the processing process can be understood by checking whether the process identification flag 13 is the "necessary" flag or the "unnecessary" flag.

Figure 6:
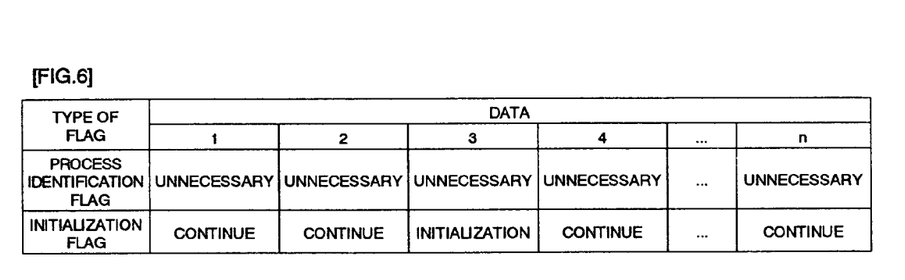
FIG. 6 shows states of the process identification flag and the initialization flag in execution of the processing process.
Figure 7:
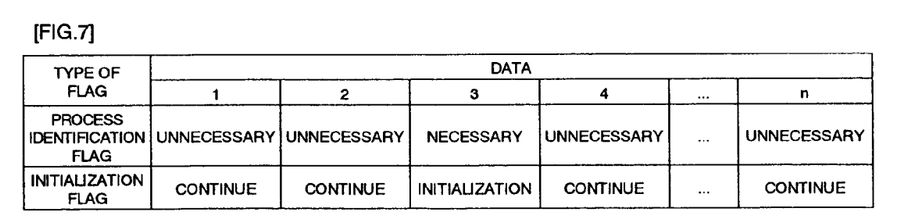
FIG. 7 shows states of the process identification flag and the initialization flag in execution of the processing process.

Operations of the process management system 1 when a processing process is interrupted by a crash will be described below with reference to FIGS. 6 and 7.

As described in the example with reference to FIG. 4, a case in which the data 3 is used in the processing process will be considered below.

Before the processing execution unit 31 executes the processing process, the process identification flag 13 and the initialization flag 14 are set in the states shown in FIG. 4.

When the processing process using the data 3 is interrupted by a crash, the crash detection unit 40 detects that the processing process crashes. In response to this, the determination unit 50 tests the process identification flag 13 to know the data 3 is used in the processing process, and then tests the initialization flag 14 of the data 3. The initialization flag 14 of the data 3 is a "continue" flag expressing that a crash did not occur in the past. Therefore, the determination unit 50 determines that the crash which occurs is not caused by the data 3 used in the processing process and, at the same time, sets an "initialization" flag as the initialization flag 14 of the data 3 to change a process identification flag 13 into an "unnecessary" flag. This is shown in FIG. 6.

Thereafter, the processing process is reexecuted. An "necessary" flag is set as the process identification flag 13 of the data 3 used in the processing process. This is shown in FIG. 7.

When the crash is caused by, e.g. an access timing regardless of the contents of the data 3, the processing process may be reexecuted to complete the processing process without any crash. In this case, it is considered that the assumption in occurrence of the first crash is wrong. The initialization flag 14 of the data 3 is returned to the "continue" flag, and the next processing process is activated.

When the reexecuted processing process is interrupted by a crash again, the determination unit 50 determines that the crash is caused by the data 3 because the initialization flag 14 of the data 3 used in the processing process is the "initialization" flag. At the same time, the determination unit 50 causes the initialization unit 20 to initialize the data 3 and changes the process identification flag 13 and the initialization flag 14 into the "unnecessary" flag and the "continue" flag, respectively.

Thereafter, the processing process is executed again.

Figure 8:
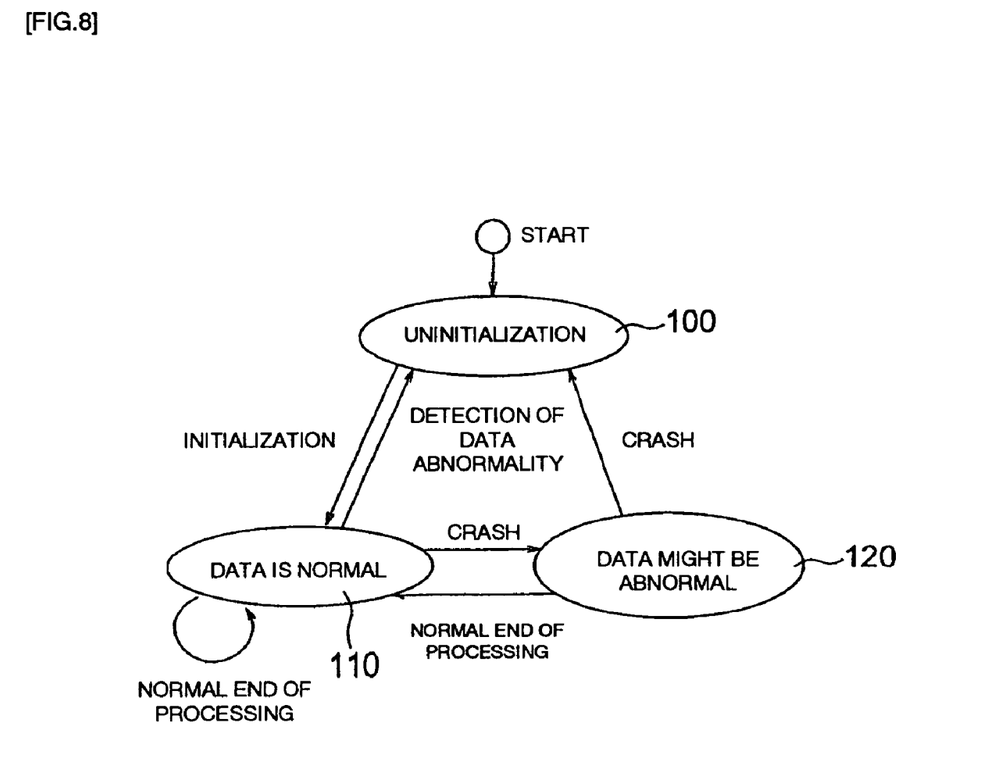
FIG. 8 shows state transitions of data.

FIG. 8 shows state transitions of the data 11 from when a crash occurs to when the processing process is reexecuted or the data is initialized.

The states of the data includes an uninitialized state (100), a state (110) in which the data is normal, and a state (120) in which the data might be abnormal. For example, when initialization is executed in the uninitialized state (100), the state changes into the state (110) in which the data is normal. When a crash occurs in the state (110) in which the data is normal, the state changes into the state (120) in which the data might be abnormal. When data abnormality is detected in this state, the state may change into the uninitialized state (100). When a crash occurs again in the state (120) in which the data might be abnormal, the state changes into the uninitialized state (100) When the process is normally ended in this state, the state may change into the state (110) in which the data is normal.

As an example of a method of detecting occurrence of a crash by the crash detection unit 40, the following method is known. That is, an in-execution processing process is periodically monitored according to a list of process identifiers (for example, process IDs of UNIX (registered trademark) or the like) of processing processes which are normally operating. When a processing process on the list is eliminated from the list of in-execution processing processes, it is determined that the processing process is abnormally ended, and the operation of the determination unit 50 is started.

Although process identifier of a processing process cannot be acquired in occurrence of a crash, when a list of process identifiers of processing processes which are operating at the present can be acquired, in place of searching for a designated process identifier, the determination unit 50 can be determined whether the crash is caused by data while using a processing process which is not on the acquired list of the process identifiers as a processing process in which a crash occurs.

Figure 9:
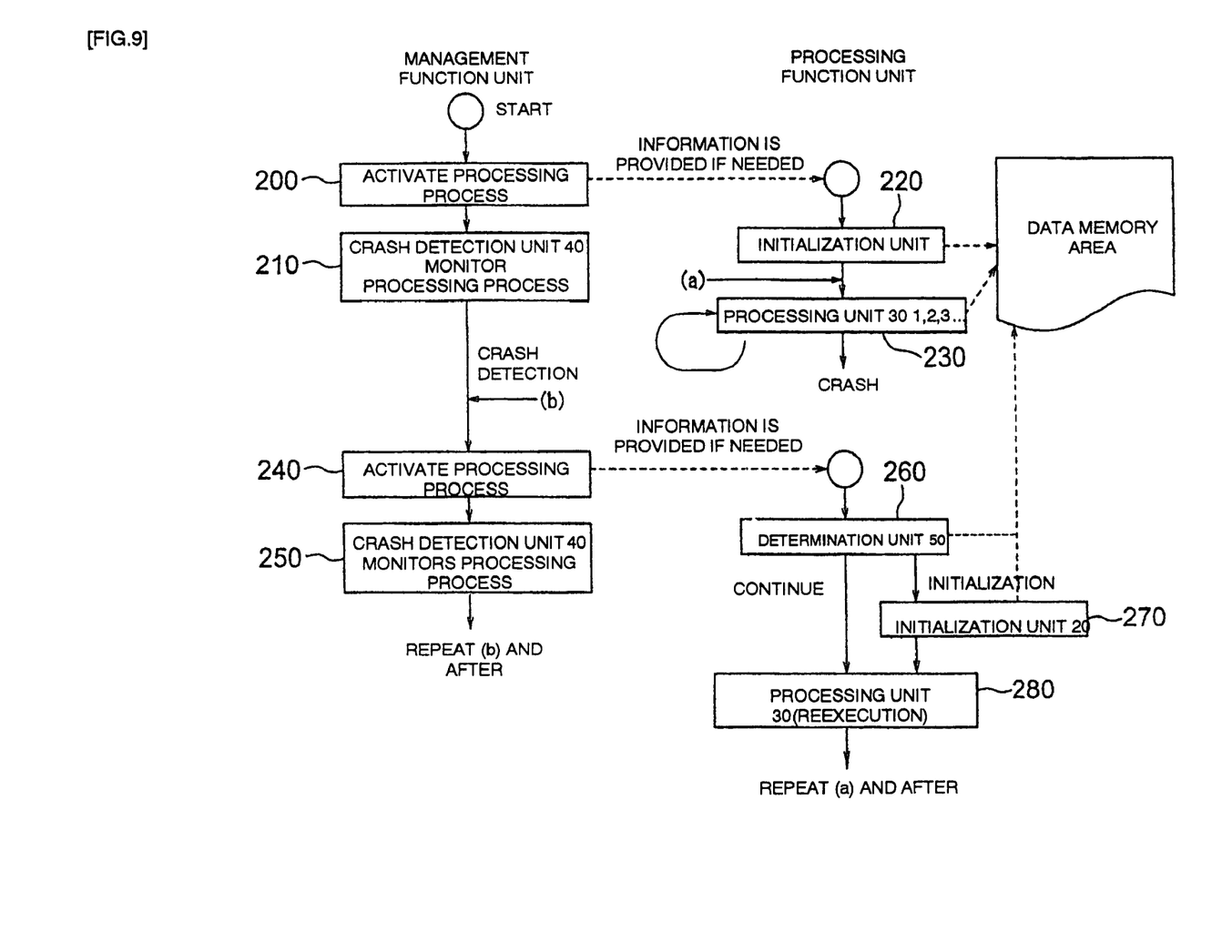
FIG. 9 shows a flow of processes performed by a management function unit and a processing function unit.

FIG. 9 shows flows of processing of a management function and a processing function included in the process management system 1.

In order to continuously execute a processing process in occurrence of a crash, the process management system 1 must include at least one management function unit which executes a management function for processing processes, and at least one processing function unit which execute actual processing of the processing process. The management function unit includes activation of a processing process, the crash detection unit 40, and the like. On the other hand, the processing function unit includes, in addition to the processing unit 30 which executes the processing process, the initialization unit 20 and the determination unit 50. The initialization unit 20 is realized by the processing function unit here because an initialization process is inherent in each software and because a crash is rarely caused by the initialization processing process itself.

The management function unit activates the processing process (200) to provide information to the processing function unit if needed. In the processing function unit, the data memory area is initialized by the initialization unit 20 (220), and the processing unit 30 (1, 2, 3, . . . ) executes the processing process by using the data held in the data memory area (230).

In the management function unit, the crash detection unit 40 monitors the processing process (210). When the crash detection unit 40 detects a crash, the crash detection unit 40 activates the processing process (240) and provides information to the processing function unit if needed. Thereafter, the crash detection unit 40 monitors the processing process again (250).

The determination unit 50 of the processing function unit tests an initialization flag of data used in the processing process in which a crash occurs, to determine whether the data is initialized or the processing process is reexecuted (260). When the data is initialized, the initialization unit 20 initializes the data (270). When the processing process is reexecuted, the processing unit 30 reexecutes the processing process (280) to advance the processing.

Figure 10:
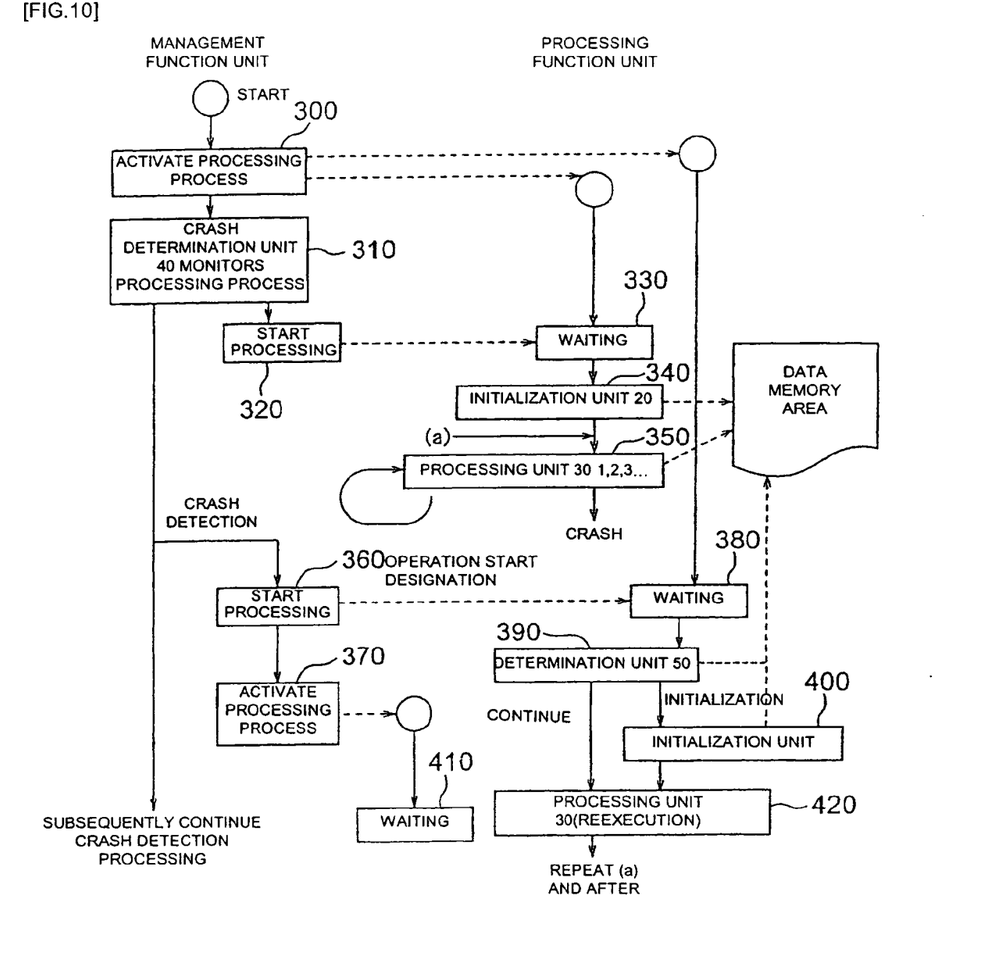
FIG. 10 shows another flow of processes performed by the management function unit and the processing function unit.

FIG. 10 shows a flow of processing in a constitution in which the processing unit includes a processing execution unit which executes the processing process and a waiting unit which waits to execute the processing process in occurrence of a crash.

The processing shown in FIG. 10 is different from that in FIG. 9 in that, in addition to the processing unit 30 (1, 2, 3, . . . ) (330, 340, and 350) which actually execute the processing process, a flow of processing in which the processing unit is caused to wait to execute the processing process by the processing function unit in occurrence of a crash (380).

The processing is started when the management function unit detects a crash (360), and the processing process is continued by using the waiting processing unit.

Figure 11:
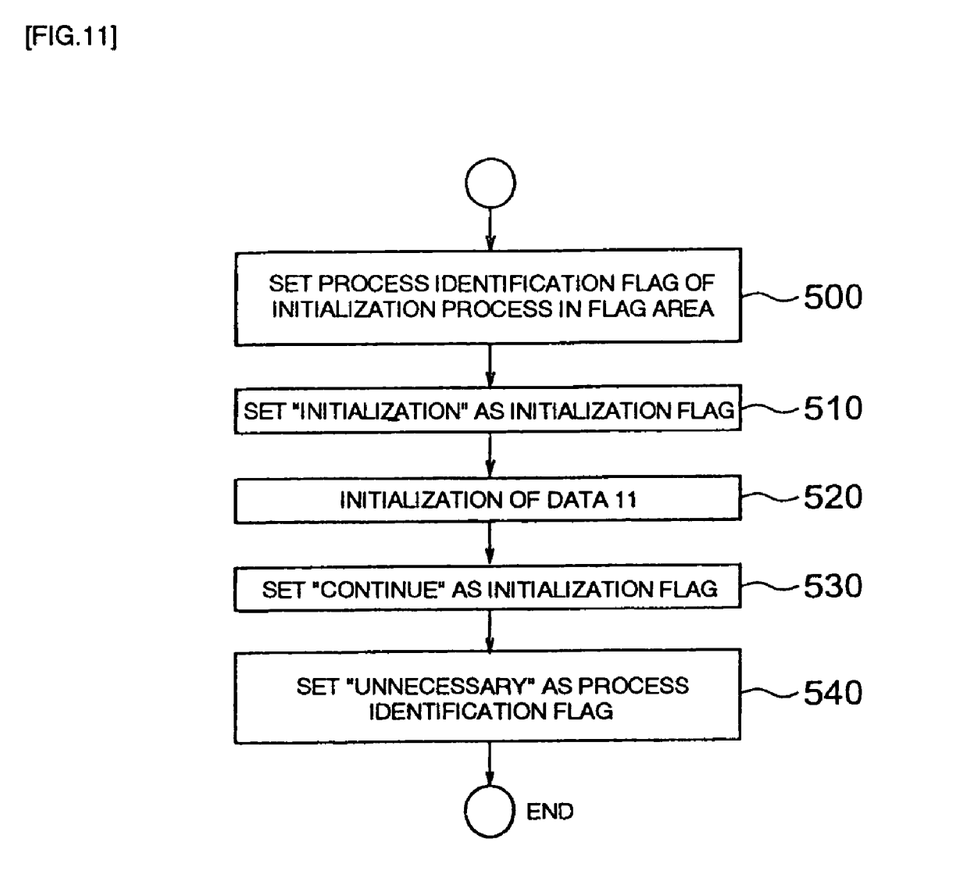
FIG. 11 shows a flow of processes in an initialization unit.

FIG. 11 shows a flow of processing of the initialization unit 20.

When a crash occurring in an initialization processing process is further considered, a flag expressing the initialization process is set as the process identification flag 13 in execution of the initialization processing process. The data is still incomplete until the processing process for the initializing the data is completed. For this reason, when the processing process is reexecuted before the processing process completion for initializing the data, the initialization flag 14 is set as an "initialization flag in execution of the initialization processing process to forcibly reexecute the initialization of the data. Upon completion of the processing process for initializing the data 11, the initialization flag 14 is changed into a "continue" flag (530), and the process identification flag 13 is changed into an "unnecessary" flag (540). The change of the initialization flag (530) and the change of the process identification flag (540) may be performed in reverse.

Figure 12:
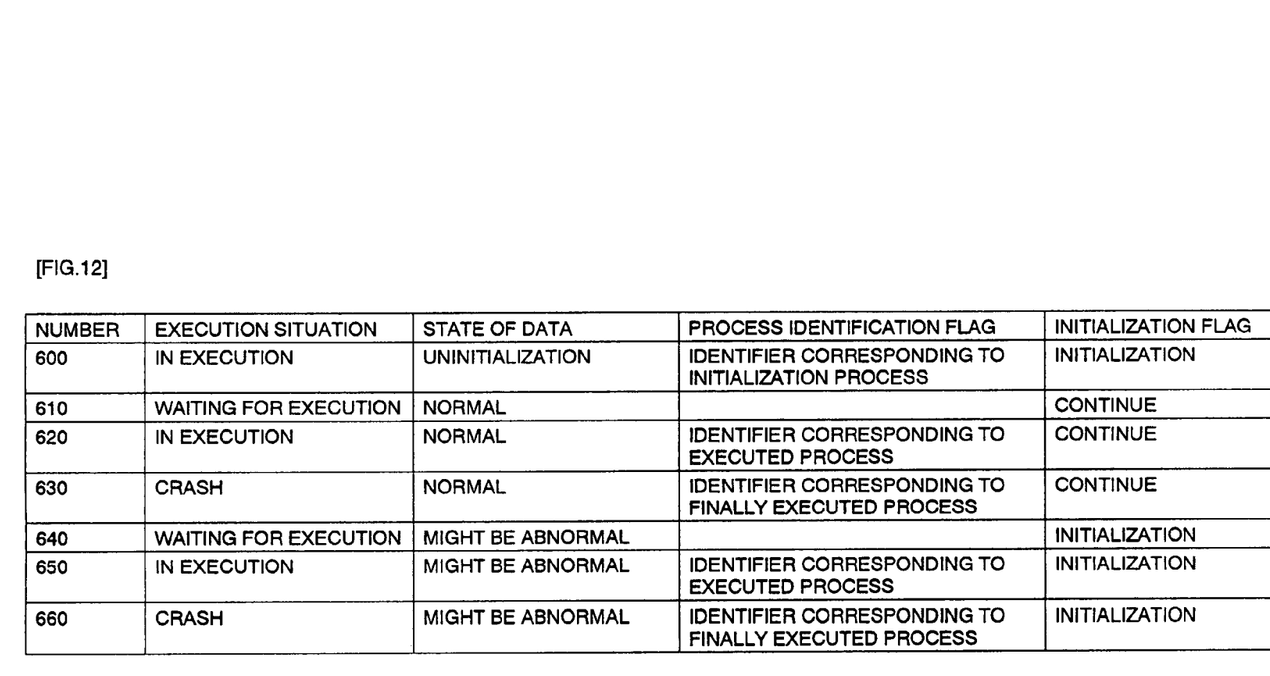
FIG. 12 shows an execution situation of a processing process, a state of data, a state of a process identification flag, and a state of an initialization flag.
Figure 13:
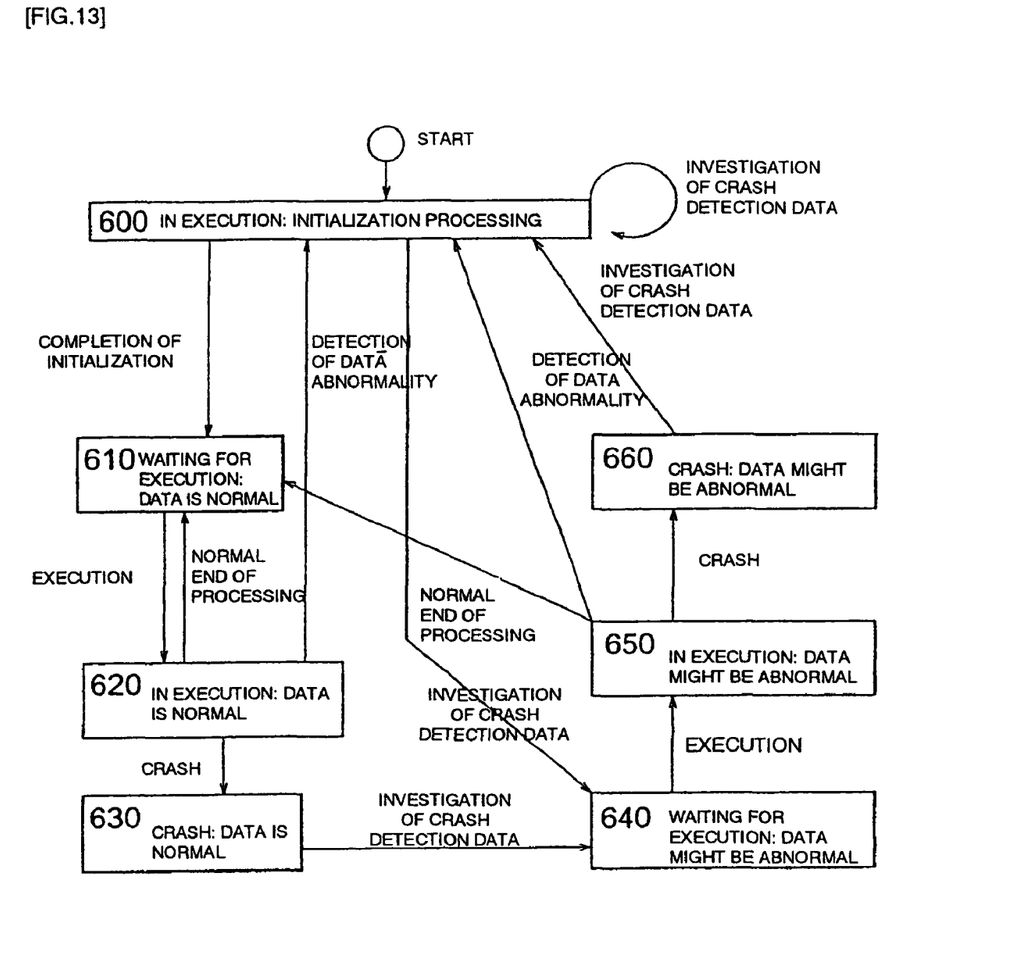
FIG. 13 shows state transitions.

FIG. 12 shows an execution situation of a processing process, a state of data, a state of a process identification flag, and a state of an initialization flag. State transitions between these states are shown in FIG. 13. The diagram shown in FIG. 13 also includes, in addition to interruption of the processing process execution caused by a crash, a transition occurring when voluntary matching test of data is performed in a program to determine that continue is impossible.

The states shown in FIGS. 12 and 13 include a state in which an initialization processing process is being executed (600), a state which waits for execution of the processing process upon completion of the initialization (610), a state in which the processing process is being executed (620), a state in which a crash occurs in execution of the processing process (630), a state which waits the next processing process when a crash occurs and the initialization flag 14 is in an "initialization" state (640), a state in which the processing process is executed in this state (650), and a state in which a crash occurs again (660).

As described above, the process management system according to the present invention, when a crash occurs in a processing process, reexecutes the processing process or initializes data without investigating the details of data used in the processing process in which the crash occurs, so that the processing process can be immediately restarted while holding the data in occurrence of the crash as much as possible.

DESCRIPTION OF REFERENCE NUMERALS

1 Process management system
10 Data memory area
20 Initialization unit
30 Processing unit
40 Crash detection unit
50 Determination unit
11 Data
12 Flag area
13 Process identification flag
14 Initialization flag
31 Processing execution unit
32 Flag setting unit
33 Flag clear unit

The invention claimed is:

1. A process management system, which executes a processing process and recovers the processing process when a crash occurs in execution of the processing process, comprising:
 a data memory area for holding data necessary for execution of the processing process;
 a processing unit for executing the processing process by using the data held in the data memory area, the processing unit further comprising at least one processing execution unit and a waiting unit;
 a crash detection unit for detecting that the processing process is interrupted due to a crash in execution of the processing process by the processing unit;
 a determination unit for determining whether the detected crash is a crash caused by the data used in the processing process, on the basis of a crash history related to the processing process in which the crash occurs; and
 an initialization unit for initializing the data held in the data memory area, wherein:
 when the determination unit determines that the detected crash is not a crash caused by the data used in the processing process, the waiting unit immediately reexecutes the processing process in which the crash occurs in place of the processing execution unit, and
 when the determination unit determines that the detected crash is a crash caused by the data used in the processing process, the initialization unit initializes the data used in the processing process.

2. The process management system according to claim 1, wherein:
 the determination unit determines that the crash is not caused by the data used in the processing process when a crash did not occur in the past in the processing process in which the detected crash occurs, and determines that the crash is caused by the data used in the processing process when a crash occurred in the past in the processing process in which the detected crash occurs.

3. The process management system according to claim 1, wherein:
 the data memory area further includes a process identification flag representing whether each data is required to execute the processing process, and an initialization flag representing that crash occurred in the past and data must be initialized when a crash is detected.

4. The process management system according to claim 1, wherein when the determination unit determines that the detected crash is not a crash caused by the data used in the processing process, the waiting unit reexecutes the processing process without testing the details of the data used in the processing process.

5. The process management system according to claim 1, wherein a crash that did not occur in the past is considered as a crash caused by an access timing.

* * * * *